United States Patent [19]
Pellegrin et al.

[11] Patent Number: 6,113,818
[45] Date of Patent: Sep. 5, 2000

[54] METHOD AND APPARATUS FOR INTEGRATING ORGANIC FIBERS WITH MINERAL FIBERS

[75] Inventors: Michael T. Pellegrin, Newark; Dennis C. Souers, Hilliard; James E. Loftus, Newark, all of Ohio

[73] Assignee: Owens Corning Fiberglas Technology, Inc., Summit, Ill.

[21] Appl. No.: 08/976,668

[22] Filed: Nov. 24, 1997

[51] Int. Cl.[7] .............................. C03B 37/04; D01D 5/00
[52] U.S. Cl. ................................... 264/6; 264/8; 264/12; 264/414; 264/460; 425/7; 425/8
[58] Field of Search .................................. 264/5, 6, 8, 11, 264/12, 13, 414, 460; 425/6, 7, 8

[56] References Cited

U.S. PATENT DOCUMENTS

| | | |
|---|---|---|
| 2,083,132 | 6/1937 | Williams et al. . |
| 4,058,386 | 11/1977 | Faulkner et al. . |
| 4,568,581 | 2/1986 | Peoples, Jr. . |
| 4,751,134 | 6/1988 | Chenoweth et al. . |
| 4,777,086 | 10/1988 | Madden et al. . |
| 4,888,235 | 12/1989 | Chenoweth et al. . |
| 4,917,715 | 4/1990 | Kaveh et al. . |
| 5,123,949 | 6/1992 | Thiessen . |
| 5,232,638 | 8/1993 | Thiessen et al. . |
| 5,236,754 | 8/1993 | McBride et al. . |
| 5,242,633 | 9/1993 | Rook et al. . |
| 5,277,955 | 1/1994 | Schelhorn et al. . |
| 5,326,241 | 7/1994 | Rook et al. . |
| 5,362,539 | 11/1994 | Hall et al. . |
| 5,437,922 | 8/1995 | Jackson et al. . |
| 5,458,822 | 10/1995 | Bakhshi et al. . |
| 5,458,960 | 10/1995 | Nieminen et al. . |
| 5,480,466 | 1/1996 | Jackson et al. . |
| 5,490,961 | 2/1996 | Bakhshi et al. . |
| 5,501,872 | 3/1996 | Allen et al. . |
| 5,523,031 | 6/1996 | Ault et al. . |
| 5,523,032 | 6/1996 | Ault et al. . |
| 5,545,279 | 8/1996 | Hall et al. . |
| 5,595,584 | 1/1997 | Loftus et al. . |
| 5,614,132 | 3/1997 | Bakhshi et al. . |
| 5,642,601 | 7/1997 | Thompson, Jr. et al. . |
| 5,679,126 | 10/1997 | Loftus et al. . |
| 5,709,925 | 1/1998 | Spengler et al. . |

FOREIGN PATENT DOCUMENTS

| | | |
|---|---|---|
| 95/30787 | 11/1995 | WIPO . |

*Primary Examiner*—Jan H. Silbaugh
*Assistant Examiner*—Kenneth M. Jones
*Attorney, Agent, or Firm*—Inger H. Eckert; Stephen W. Barns

[57] ABSTRACT

A method of integrating organic fibers with mineral fibers includes centrifuging organic fibers from molten organic material, using a rotating organic fiber spinner, directing the organic fibers into a downwardly moving veil of organic fibers and gases, with the veil having an inwardly converging shape as it moves downward, centrifuging mineral fibers from molten mineral material using a rotary mineral fiber spinner positioned concentrically within the downwardly moving veil of organic fibers, directing the mineral fibers into a downwardly moving veil of mineral fibers and gases within the veil of organic fibers, wherein the veil of mineral fibers intersects with the veil of organic fibers to integrate the mineral fibers with the organic fibers, and collecting the integrated mineral fibers and organic fibers as a fibrous pack. An apparatus for performing the method is also disclosed.

19 Claims, 4 Drawing Sheets

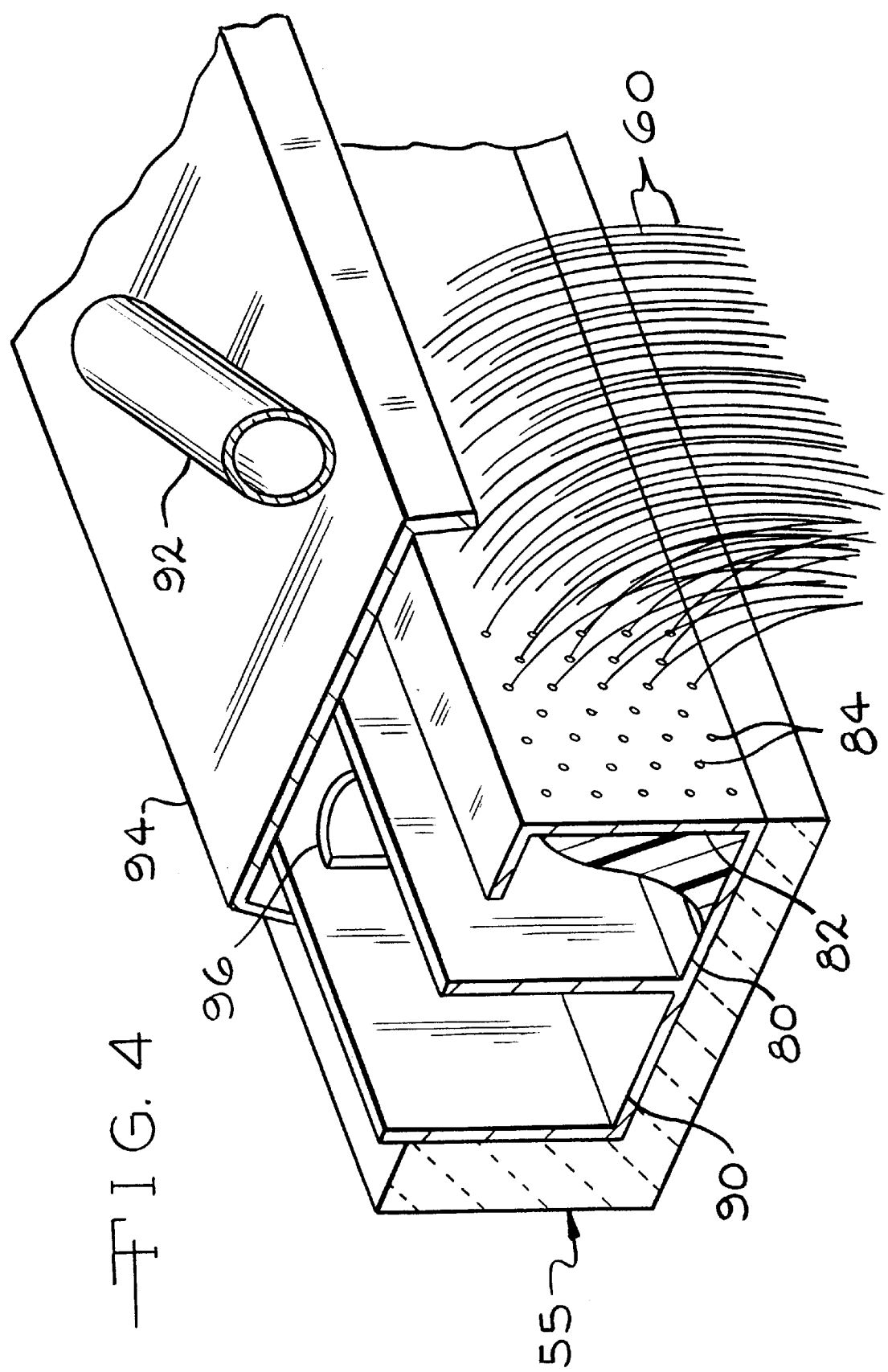

METHOD AND APPARATUS FOR INTEGRATING ORGANIC FIBERS WITH MINERAL FIBERS

CROSS-REFERENCE TO RELATED APPLICATIONS

The present invention is related to the inventions of the following U.S. patent application Ser. Nos. 08/976,671, entitled FIBROUS INSULATION HAVING INTEGRATED MINERAL FIBERS AND ORGANIC FIBERS, AND BUILDING STRUCTURES INSULATED WITH SUCH FIBROUS INSULATION, filed on even date herewith, now U.S. Pat. No. 5,983,586, and hereby incorporated by reference; Ser. No. 08/977,361, entitled A METHOD OF FORMING A PACK OF ORGANIC AND MINERAL FIBERS, filed on even date herewith, now U.S. Pat. No. 5,876,529, and hereby incorporated by reference; and Ser. No. 08/977,405, entitled A METHOD OF MAKING A FIBROUS PACK, filed on even date herewith, now U.S. Pat. No. 5,900,206, and hereby incorporated by reference. The instant and the three cited applications are all commonly assigned.

TECHNICAL FIELD AND INDUSTRIAL APPLICABILITY OF THE INVENTION

This invention relates to the manufacture of fibrous products for such uses as thermal and acoustical insulation and as structural molding media. More particularly, this invention relates to processes for manufacturing fibrous products having both mineral fibers and organic fibers, such as polymer fibers, with the different fibers being integrated with each other for beneficial product properties.

BACKGROUND OF THE INVENTION

Mineral fiber products, particularly products made of glass fibers, are typically made as either continuous fibers or discontinuous fibers. Various organic coatings can be applied to these fibers for protecting the fibers from abrasion, for connecting the mineral fibers to each other to form a structural product, and for providing compatibility of the mineral fibers with other materials, such as the compatibility between the reinforcement fiber and a plastic matrix. In the case of insulation products, the mineral fibers are usually bonded together by organic material, such as a phenol/formaldehyde binder, to form a spring-like matrix which can recover after compression during packaging. One mat product having both glass fibers and fibers of organic material, and manufactured by a textile non-woven process, is disclosed in U.S. Pat. No. 4,751,134 to Chenoweth et al.

The application of organic material to the mineral fibers can take several forms. Continuous mineral fibers can be run through a bath or across a coater to apply a coating to the fibers, such as during the application of a size to continuous fibers. Alternatively, the organic material can be sprayed onto the mineral fibers. This method is commonly used in the manufacture of insulation products with a rotary process where a cylindrical veil of mineral fibers is met with the sprays of the phenol/formaldehyde binder.

One of the problems with applying aqueous organic binders of the prior art to cylindrical veils of mineral fibers is that a portion of the binder tends to evaporate prior to contact between the liquid binder drop and a mineral fiber in the veil. This problem is exacerbated by the need to apply the binder relatively close to the fiberizer, i.e., where the hot environment is particularly likely to cause some of the liquid binder droplets to evaporate before contacting a glass fiber. The evaporated binder material becomes a contaminant in the exhaust air stream of the process and must be cleaned up in order to avoid pollution problems. Also, the binder material on the mineral fibers tends to be sticky, requiring extensive cleaning of the fiber collection apparatus to prevent the build-up of clumps of glass fiber insulation material which can drop into the product and cause a product defect. Further, the binder material must be cured in an oven, requiring tremendous energy not only for curing the binder itself, but also for driving off the water associated with the binder, and for environmentally cleaning the gaseous by-products of the heating and curing process.

Attempts have been made in the past to integrate organic binder materials with mineral fibers from a rotary process without merely spraying the veil of fibers with an aqueous solution of the binder material. For example, U.S. Pat. No. 5,123,949 to Thiessen discloses a rotary fiberizing process where additive particles are supplied through the hollow quill or axle of the rotating spinner. The particles are directed toward the veil of mineral fibers from a locus within the veil. The additive particles can be fibrous in nature, such as cellulose fibers, and also can be resinous material in a particulate form.

Another approach in integrating organic material with rotary mineral fibers is disclosed in U.S. Pat. No. 5,614,132 to Bakhshi et al. A glass rotary fiberizer is operated to produce a downwardly moving hollow veil of glass fibers, and a polymer fiberizer is operated within the hollow veil to produce polymer fibers within the veil but directed radially outwardly toward the glass fibers. The polymer fibers commingle with the glass fibers, producing a reinforced resinous product having both glass fibers and polymer fibers. While the process of the Bakhshi et al. patent is effective for making certain products, it can be desirable in certain instances to move the polymer fiber forming environment further from the intensive heat of the mineral fiber forming environment.

For example, an alternative to the coaxial rotary commingling process, U.S. Pat. No. 5,595,584 to Loftus et al. discloses an alternate commingling process where glass rotary fiberizers centrifuging glass fibers, and polymer rotary fiberizers centrifuging polymer fibers, are positioned alternately with each other arranged along a collection surface. The polymer fiberizer can be oriented at an angle to the vertical so that the flow of polymer fibers is directed at an angle into contact with the veil of glass fibers. While the purpose of the alternate commingling process was to decouple the polymer fiber forming environment from the glass fiber forming region, it was perceived to be quite difficult to uniformly integrate the rotary-formed polymer fibers into the veil of glass fibers. The nonuniformities of the rotary polymer process combined with the swirling, chaotic environment of the glass fiber forming region would prohibit significant penetration of the polymer fibers into the glass fibers, potentially resulting in an unpredictable, laminar product having less than desired properties for some products.

It would be advantageous if there was developed an improved process for integrating polymer or other organic fibers into a flowing stream of glass fibers to produce a generally uniform mix of glass fibers and polymer fibers, preferably uniform by fiber distribution and uniform by weight. Such a process should provide protection for the polymer material supplied in fibrous form so that the fibers are not subjected to a hot environment which could undesirably vaporize the polymer material or otherwise degrade the polymer material, or which could soften or melt the polymer fibers into non-fibrous particles.

SUMMARY OF THE INVENTION

The above objects as well as other objects not specifically enumerated are achieved by a method of integrating organic fibers with mineral fibers by directing a veil of organic fibers into intersection with a veil of mineral fibers. According to the present invention, the method of integrating organic fibers with mineral fibers includes centrifuging organic fibers from molten organic material, using a rotating organic fiber spinner, directing the organic fibers into a downwardly moving veil of organic fibers and gases, with the veil having an inwardly converging shape as it moves downward, centrifuging mineral fibers from molten mineral material using a rotary mineral fiber spinner positioned concentrically within the downwardly moving veil of organic fibers, directing the mineral fibers into a downwardly moving veil of mineral fibers and gases within the veil of organic fibers, wherein the veil of mineral fibers intersects with the veil of organic fibers to integrate the mineral fibers with the organic fibers, and collecting the integrated mineral fibers and organic fibers as a fibrous pack.

According to this invention, there is also provided apparatus for integrating organic fibers with mineral fibers including a rotating organic fiber spinner for centrifuging organic fibers from molten organic material, an annular polymer fiber blower for directing the organic fibers into a downwardly moving veil of organic fibers and gases, with the veil having an inwardly converging shape as it moves downward, a rotary mineral fiber spinner positioned concentrically within the downwardly moving veil of organic fibers for centrifuging mineral fibers from molten mineral material, an annular glass fiber blower for directing the mineral fibers into a downwardly moving veil of mineral fibers and gases within the veil of organic fibers, wherein the veil of mineral fibers intersects with the veil of organic fibers to integrate the mineral fibers with the organic fibers, and a collection surface for collecting the integrated mineral fibers and organic fibers as a fibrous pack.

BRIEF DESCRIPTION OF THE DRAWINGS

FIG. 4 is schematic view in perspective of the spinner of FIG. 3.

DETAILED DESCRIPTION OF THE INVENTION

This invention will be described using glass fibers as an example of the mineral fibers of the invention. It is to be understood that the invention can be practiced using mineral fibers of other heat-softenable mineral material, such as rock, slag and basalt. Also, although the invention will be described using polymer fibers as the fibers to be directed into contact with the glass fibers, it is to be understood that fibers of any organic material, such as asphalt material, can be used with the invention, especially long or substantially continuous fibers suitable for enhancing the product properties.

Figure 1:
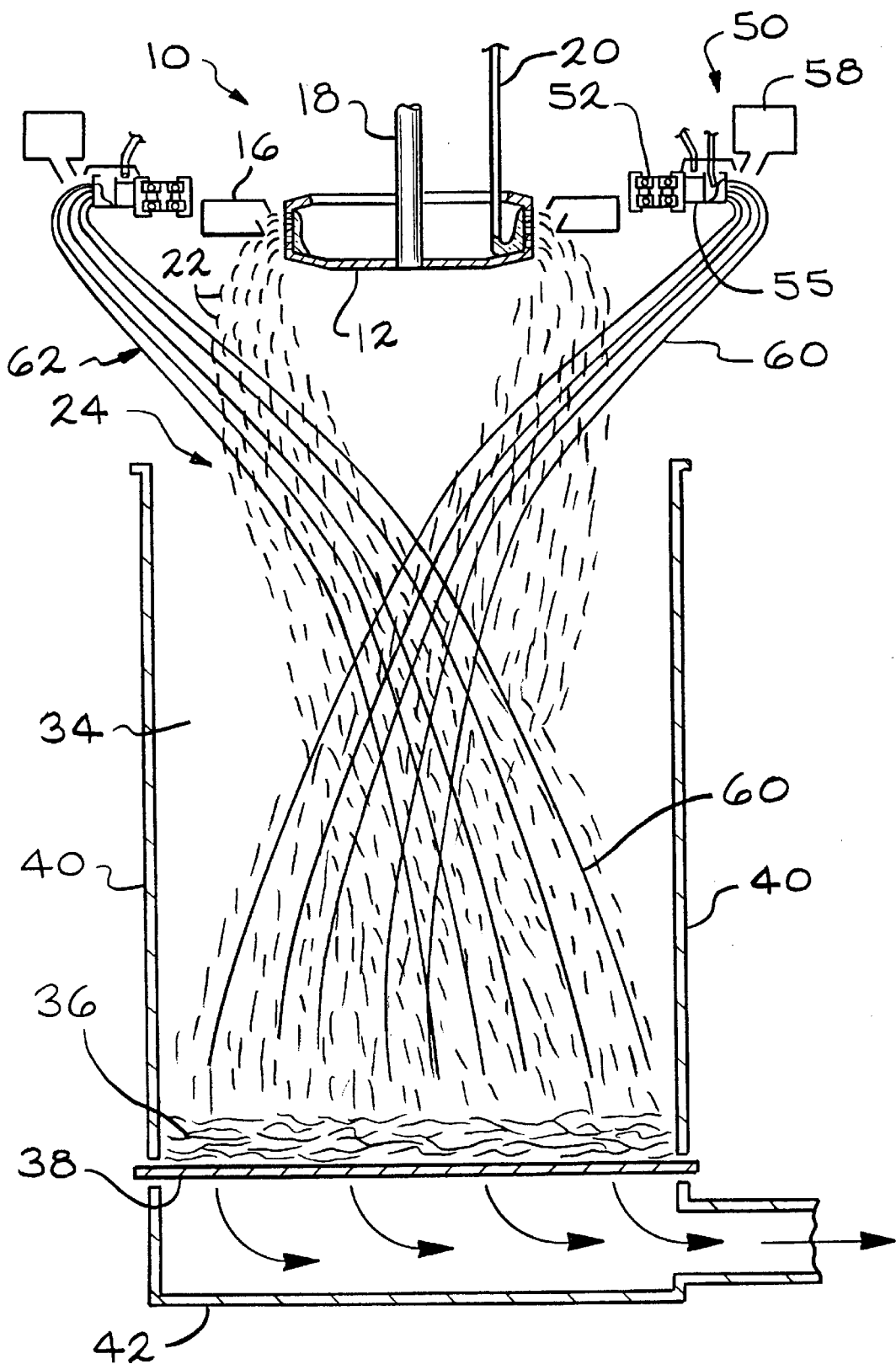
FIG. 1 is a schematic view in elevation of apparatus for integrating polymer fibers with glass fibers according to the method of the invention.

As shown in FIG. 1, the glass fiberizing apparatus, indicated generally at 10, includes a spinner 12 and an annular blower 16. The spinner is rotated on an axle or quill 18. A stream 20 of molten glass is delivered from a glass melting furnace, not shown, and the molten stream 20 drops into the interior of the rotating spinner 12. The centrifugal forces of the rotating spinner force the molten glass to emanate from the spinner in the form of fine glass streams that are turned downwardly as glass fibers 22 by the action of the blower 16 and gases induced by the blower. The blower gases and induced air attenuate the glass fibers into their final fine diameter, typically within the range of from about 3 to about 8 microns. A gas fired burner, not shown, can also be used to supply heat to the spinner and the fiber forming environment.

The glass fibers travel in a downwardly moving veil 24, which is generally cylindrical in shape, and which contains not only the glass fibers, but also rapidly moving air from the blower. The veil 24 initially has a diameter slightly larger than the diameter of the spinner. The size or diameter of the veil, and the rotational speed of the gases and fibers within the veil, change as the veil moves downwardly. These changes are due to dissipation of the original energy of the gases within the veil, and on external forces influencing the veil.

Nozzles, not shown, can optionally be positioned to direct liquid sprays into the veil. Such sprays could include water or other evaporative liquid to cool the fibers and associated gases within the veil. The nozzles could also spray a lubricant onto the fibers to reduce fiber-to-fiber friction in the ultimate insulation product, which could thereby prevent fiber damage. If desired, the nozzles could also be used to add an optional resinous binder to the glass fibers, although the method of the invention should result in a product having integrity and recovery properties good enough that a binder is not needed. Resinous binders, such as a urea phenol formaldehyde, are well known in the art. Also, air lappers, not shown, can be used to discharge air to sweep or direct the veil 24 from side to side of the forming hood 34 so that the pack 36 collected on the moving collection surface or forming chain 38 will have an even distribution across the width of the forming chain, from one hood wall 40 to the other. The forming chain 38 is mounted for movement as a conveyor, and is foraminous so that a suction box 42, positioned beneath the forming chain, can evacuate of gasses from the hood 34 and pack 36.

Positioned circumferentially outside the glass fiber fiberizing apparatus 10 is a rotary polymer fiberizing apparatus, indicated generally at 50. The rotary polymer fiberizing apparatus 50 can be any suitable rotary equipment suitable for making fibers from organic material, including such materials as polymer materials and asphalt. The polymer fiberizer 50 is generally comprised of a bearing assembly 52, a polymer spinner 55, and an annular blower 58. The polymer spinner 55 is mounted for rotation by means of the bearing assembly 52. The polymer spinner receives molten polymer material and centrifuges it into polymer fibers 60. The annular blower supplies a flow of air to provide additional attenuation of the polymer fibers beyond the attenuation supplied by centrifugal force. The annular blower also directs the polymer fibers 60 into a downwardly moving veil 62 of polymer fibers 60.

Figure 2:
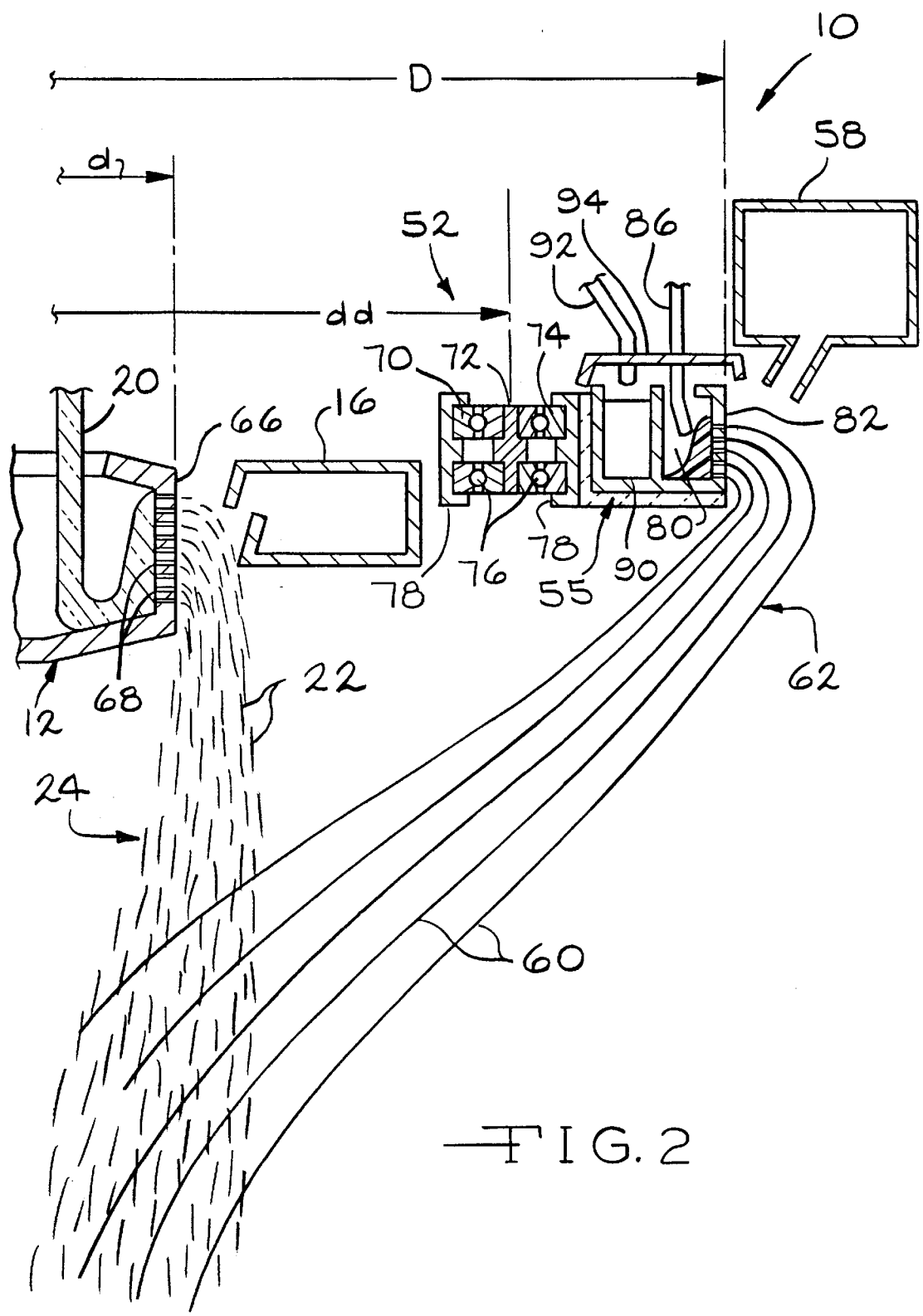
FIG. 2 is a partial elevational view of the apparatus of FIG. 1 showing more detail of the bearing assembly of the fiberizer of FIG. 1.

As shown more clearly in FIG. 2, the glass spinner has a peripheral wall 66 containing a multiplicity of orifices 68 through which the molten glass is drawn by centrifugal force to form the glass fibers 22. The bearing assembly 52 can include an inner race 70, a center race 72 and an outer race 74, and a set of ball bearings 76 between each of the adjacent races, i.e., between the inner and center races, and between the center and outer races. The use of a first set of bearings between the inner and center races, and a second set of bearings between the center and outer races gives longer life to the bearings 76 since the differences in the relative speed between adjacent races are reduced. Thermal insulation material, such as ceramic fiber insulation layers 78, can be mounted on the sidewalls of the bearing assembly 52 to protect the bearings and their lubrication from the radiant heat radiating from the glass spinner 12. Other designs for bearing assemblies for mounting the polymer spinner 55 for rotation can be used.

As shown most clearly in FIGS. 2 & 4, the polymer spinner 55 is comprised of an outer annular chamber 80 having a peripheral wall 82 containing orifices 84 through which the molten polymer material flows to form the polymer fibers 60. A flow of molten polymer material is supplied to the outer annular chamber 80 via polymer feed tube 86, from a source of molten polymer material, such as an extruder, not shown. The polymer fiberizer can be operated under conditions suitable for making polymer fibers having a diameter greater than about 5 microns, and preferably within the range of from about 4 to about 25 microns, and most preferably about 6 microns. A general description of desired process settings, such as temperature, pressure and orifice diameter, for the proper operation of a rotary fiberizer for making polymer fibers is found in U.S. Pat. No. 5,523,031, to Ault et al., which is hereby incorporated herein by reference in its entirety.

The polymer material can be any polymeric material from which fibers of suitable length, strength, durability and insulation characteristics can be formed. The polymer fiberizer 50 can be operated under conditions suitable for producing short or long fibers, but it is preferred to produce substantially continuous lengths. Suitable polymer materials for making the polymer fibers include, but are not limited to, polyethylene terephthalate (PET), polypropylene, and polyphenylene sulfide (PPS). Other polymer materials suitable for making fibers include nylon, polycarbonate, polystyrene and polyamide. Even though the invention is described using polymer fibers as an example, it is to be understood that other materials, including resins, asphalts, and other thermoplastic and thermoset materials, can be used as the fibers for use with the present invention. Polypropylene and PET are preferred materials for forming the polymer fibers.

Figure 3:
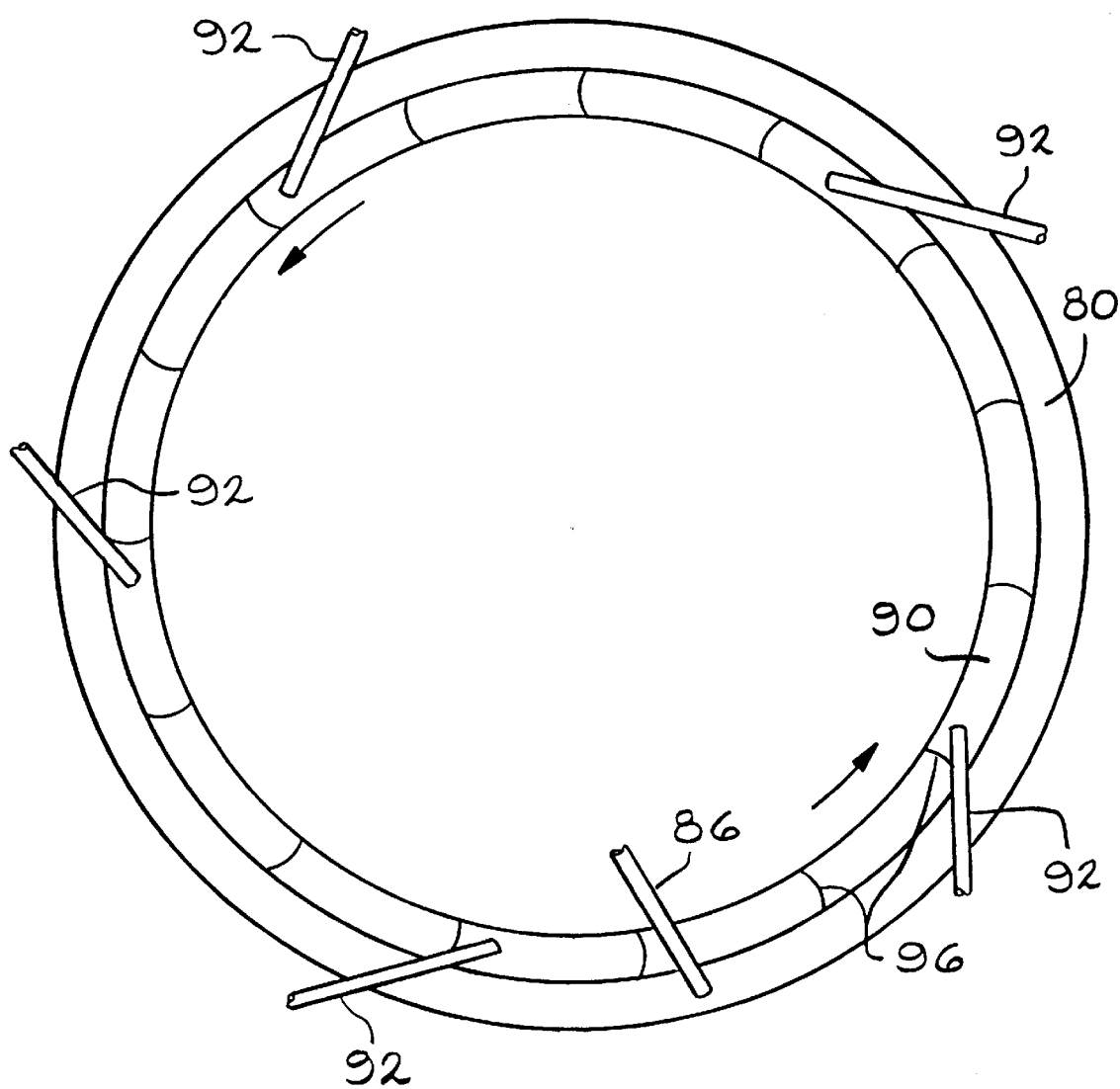
FIG. 3 is a schematic plan view of the spinner of the apparatus shown in FIG. 1.

As shown in FIGS. 2–4, an optional feature of the invention is providing the polymer spinner 55 with an inner annular chamber 90, which can be used for either or both of two separate functions or advantages. First, the inner chamber 90 can be used as a hot air plenum to feed incoming hot air along a path across the top of the polymer spinner 55 and downwardly along the outside of the polymer spinner peripheral wall 82. A hot air supply conduit 92 furnishes heating air or other gasses to the inner annular chamber 90, and the hot gases are directed by a shield 94 to flow downwardly along the peripheral wall 82 of the outer annular chamber 80. The hot air is supplied by an air heater, not shown, and is preferably at a temperature greater than about 200° C. The shield can be of any shape and material suitable for directing the hot gases so that the polymer spinner wall and the nascent fibers are maintained in a heated condition. Preferably, the hot gases are supplied to the spinner 55 at a temperature of at least 200° C., and more preferably at least 250° C. The shield is not shown in FIG. 3, for clarity. The shield is advantageously provided with openings to allow the polymer feed tube 86 and the hot sir supply conduits 92 to pass through the shield.

The second function of the inner annular chamber 90 is to provide a mounting location for air fins 96 which can be used to drive or rotate the polymer spinner 55. The fins 96 drive the polymer spinner 55 in a manner similar to the driving action of a turbine, i.e., the polymer feed tube 86, the hot air supply conduits 92, and the shield 94 remain stationary, while the hot air from the conduits 92 contacts the fins 96 to cause the spinner 55 to rotate. The number of fins 96 and hot air supply conduits 92 can vary, and the angle of orientation of the hot air supply conduits with respect to the fins can also be varied for optimum results by the propelling gases.

Preferably, approximately 200 standard cubic feet of air per minute at a temperature of 316° C. will be injected into the polymer spinner at an injection velocity of about 500 feet per second. A higher or lower injection velocity or volume of hot air may be necessary. The volume, velocity and temperature of the hot air can be adjusted to optimize the rotation rate as well as the fiber forming environment. The polymer spinner can be varied. For a 30 inch diameter spinner, a preferred rotation rate is 1000 revolutions per minute.

Although the hot gases for heating the spinner are described above as being the same as the propelling gases for rotating the spinner, it is to be understood that the hot gases and the propelling gases could be distinct gases, supplied separately. Also, it is to be understood that the polymer spinner could be rotated by different means other the air/fin system disclosed above. Further, the polymer fiber spinner 55 can be rotated at an angular speed and direction different from the angular speed and direction of the glass fiber spinner 12.

The polymer fibers 60 in the polymer fiber veil 62 are directed by the polymer blower 58 into contact with the glass fibers 22 to integrate the polymer fibers with the glass fibers. The intermingled polymer fibers 60 and glass fibers 22 are collected together in the form of the insulation pack 36. It is to be understood that the method of the invention can be carried out using a direct formed fiber collection system, not shown, such as disclosed in published PCT application No. WO 95/30787, which is hereby incorporated herein by reference in its entirety. The throughput of the polymer fiberizer 50 will preferably be set to provide a polymer content, by weight, within the range of from about 1 to about 10 percent of the expected total throughput of the glass fibers and polymer fibers. For example, if the glass fiber throughput is 1000 pounds per hour (454 kg/hr) and the desired loss on ignition (LOI) of polymer fibers is 2.5 percent, then the polymer fiberizer would be configured to have a throughput of about 25.6 pounds per hour (11.7 kg/hr). The LOI is the percentage of the total material that is organic and will burn off when heated.

As shown in FIG. 2, the polymer fiber spinner 55 has a diameter D that is considerably larger than the diameter d of the glass fiber spinner 12. Preferably, the polymer spinner has a diameter D that is within the range of from about 1.3 to about 2.2 times the diameter of the glass fiber spinner 12. Further, the bearing assembly 52 has a diameter dd that is at least 90 percent of the diameter D of the polymer spinner 55. The diameter dd of the bearing assembly is measured from the radial center of the bearing assembly, as shown in FIG. 2. These diameters are important to limit the amount of heat transmitted to the polymer forming environment from the glass forming environment, while still allowing effective intermingling. The blower 58 aims its jet of attenuating gases at an inwardly converging angle so that the polymer fibers intersect the veil at a locus above the forming chain so that the polymer fibers 60 will successfully intermingle with the glass fibers 22 before the glass fibers are collected. Otherwise there will not be integration of the polymer fibers with the glass fibers, and all or substantially all of the polymer material will end up outside or on the top side of the collected fibrous product. A balance must be maintained to assure that the polymer fibers are aimed high enough into the glass fiber veil 24 for good penetration, and yet not so high that the polymer fibers encounter heat sufficient to melt too many of the fibers. It is important to retain a majority of the organic material in fibrous form.

The direct pack 36 can be taken through a product shaping oven, not shown, where hot gases are blown through the pack to slightly soften the polymer fibers 60 so that they bond to the glass fibers to form an insulation product having good pack integrity. Preferably, the pack is under vertical compression during the product shaping process so that the product thickness is defined. Care must be taken not to heat the polymer fibers to such an extent that a substantial portion of the polymer fibers melt or otherwise lose their fibrous form. It is important to retain a majority of the organic material in fibrous form. Thereafter, the fibrous product can be cooled while still held in vertical compression.

It can be seen by the above discussion that the introduction of relatively long and strong polymer fibers into the relatively short glass fibers can be used to effect different product attributes in insulation products produced according to the method of the invention. The capability and flexibility of the method of the invention will enable the manufacture of improved products, having better weight distribution and better fiber distribution without the need for auxiliary distribution or lapping devices for the polymer fibers. Further, there is an improved control of the nature of the polymer fiber/glass fiber interface, including the degree of entanglement between the polymer fibers and the glass fibers. The fibrous pack can be subjected to a heat setting oven to soften the polymer fibers to an extent sufficient to bond the polymer fibers to the glass fibers without causing the polymer fibers to lose their fibrous nature. Further, surface layers of polymer fibers on fibrous products could be subjected to a heating process to convert the layer of polymer fibers into a bonded polymeric network for advantageous product qualities. Such a surface layer would make the resulting insulation product stronger and more amenable to handling without damage. Also, the fibrous pack could be subjected to a molding process in which either the whole fibrous pack or the surfaces of the pack could be molded under heat and pressure to form various insulation or structural products. Additionally, the introduction of relatively long and strong polymer fibers into the predominantly glass fiber pack provides several significant advantages. First it makes the pack more suitable for a needling process, which will enable the production of insulation products without traditional binders. Second, it advantageously provides greatly increased mechanical and tensile strength, thereby allowing the insulation products to exhibit improved handleability. For example, binderless wall cavity insulation products, capable of being picked up and held by holding one end, can be made using the method of the invention. Finally, the polymer fibers are lighter than glass, and on a weight basis provide an increased surface area vis-à-vis glass fibers, thereby contributing to improved thermal and acoustical performance.

The principle and mode of operation of this invention have been described in its preferred embodiment. However, it should be noted that this invention may be practiced otherwise than as specifically illustrated and described without departing from the scope of the invention.

What is claimed is:

1. A method of integrating organic material fibers with mineral material fibers comprising:

centrifuging organic material fibers from molten organic material, using a rotating organic fiber spinner;

directing the organic material fibers into a downwardly moving veil of organic material fibers and gases, with the veil having an inwardly converging shape as it moves downward;

centrifuging mineral material fibers from molten mineral material delivered from a mineral material melting furnace by using a rotary mineral material fiber spinner positioned concentrically within the downwardly moving veil of organic fibers;

directing and attenuating with an annular mineral material fiber blower the mineral material fibers into a downwardly moving veil of mineral material fibers and gases within the veil of organic material fibers, wherein the veil of mineral material fibers intersects with the veil of organic material fibers to integrate the mineral material fibers with the organic material fibers; and collecting said integrated mineral material fibers and organic material fibers as a fibrous pack.

2. The method of claim 1 wherein the average diameter of the organic fibers is within the range of from about 4 to about 25 microns.

3. The method of claim 2 in which the organic fiber spinner has a diameter within the range of from about 1.3 to about 2.2 times the diameter of the mineral fiber spinner.

4. The method of claim 3 in which the organic fiber spinner is mounted for rotation on bearings in a bearing assembly, the bearing assembly having a diameter of at least 90 percent of the diameter of the organic fiber spinner.

5. The method of claim 1 in which the organic fiber spinner is mounted for rotation on bearings in a bearing assembly, the bearing assembly being thermally insulated for protection from heat from the mineral fiber spinner.

6. The method of claim 1 in which the organic fiber spinner is mounted for rotation on bearings in a bearing assembly, the bearing assembly having an inner race, a center race, and an outer race.

7. The method of claim 1 in which the rotating organic fiber spinner has an outer annular chamber having an orificed peripheral wall, and the rotating organic fiber spinner is a component of a rotary organic fiber fiberizer having a shield positioned above the spinner, further including the steps of supplying the outer annular chamber with molten organic material for fiberization through the peripheral wall, and supplying heating gases at a temperature greater than about 200° C. to the fiberizer for heating the spinner, where the gases are directed by the shield to flow downwardly along the peripheral wall of the outer annular chamber.

8. The method of claim 7 in which the rotating organic fiber spinner has both the outer annular chamber having an orificed peripheral wall, and an inner annular chamber having a plurality of fins, and further including the step of directing propelling gases at the fins in the inner annular chamber to rotate the organic fiber spinner.

9. The method of claim 8 in which the heating gases and the propelling gases are the same gases.

10. The method of claim 1 in which the rotating organic fiber spinner has both an outer annular chamber having an orificed peripheral wall, and an inner annular chamber having a plurality of fins, and further including the steps of supplying the outer annular chamber with molten organic material for fiberization through the peripheral wall, and directing propelling gases at the fins in the inner annular chamber to rotate the organic fiber spinner.

11. Apparatus for integrating organic material fibers with mineral material fibers comprising:

a rotating organic material fiber spinner for centrifuging organic material fibers from molten organic material;

an annular organic material fiber blower for directing the organic material fibers into a downwardly moving veil of organic material fibers and gases, with the veil having an inwardly converging shape as it moves downward;

a molten organic material supplier for supplying said molten organic material to said rotating organic material fiber spinner;

a rotary mineral fiber spinner positioned concentrically within the downwardly moving veil of organic material fibers for centrifuging mineral material fibers from molten mineral material;

a mineral material melting furnace for producing molten mineral material to said rotary mineral fiber spinner;

an annular mineral material fiber blower for attenuating the mineral fibers and for directing the mineral fibers into a downwardly moving veil of mineral fibers and gases within the veil of organic fibers, wherein the veil of mineral fibers intersects with the veil of organic fibers to integrate the mineral fibers with the organic fibers;

wherein said rotating organic fiber spinner is positioned circumferentially outside said rotary mineral fiber spinner; and a collection surface for collecting the integrated mineral fibers and organic fibers as a fibrous pack.

12. The apparatus of claim 11 in which the organic fiber spinner has a diameter within the range of from about 1.3 to about 2.2 times the diameter of the mineral fiber spinner.

13. The apparatus of claim 12 in which the organic fiber spinner is mounted for rotation on bearings in a bearing assembly, the bearing assembly having a diameter of at least 90 percent of the diameter of the organic fiber spinner.

14. The apparatus of claim 11 in which the organic fiber spinner is mounted for rotation on bearings in a bearing assembly, the bearing assembly having a diameter of at least 90 percent of the diameter of the organic fiber spinner.

15. The apparatus of claim 11 in which the organic fiber spinner is mounted for rotation on bearings in a bearing assembly, the bearing assembly being thermally insulated for protection from heat from the mineral fiber spinner.

16. The apparatus of claim 11 in which the organic fiber spinner is mounted for rotation on bearings in a bearing assembly, the bearing assembly having an inner race, a center race, and an outer race.

17. The apparatus of claim 11 in which the rotating organic fiber spinner has an outer annular chamber having an orificed peripheral wall, and the rotating organic fiber spinner is a component of a rotary organic fiber fiberizer having a shield positioned above the spinner for directing heating gases to flow downwardly along the peripheral wall of the outer annular chamber.

18. The apparatus of claim 17 in which the rotating organic fiber spinner has both the outer annular chamber having an orificed peripheral wall, and an inner annular chamber having a plurality of fins adapted to rotate the organic fiber spinner when impinged upon by propelling gases directed at the fins.

19. The apparatus of claim 11 in which the rotating organic fiber spinner has both an outer annular chamber having an orificed peripheral wall, and an inner annular chamber having a plurality of fins adapted to rotate the organic fiber spinner when impinged upon by propelling gases directed at the fins.

* * * * *